United States Patent [19]

Lindblom et al.

[11] Patent Number: 4,574,854

[45] Date of Patent: Mar. 11, 1986

[54] BUNDLE LIMBING DEVICE

[75] Inventors: Thore Lindblom, Alfta; Haldo Karlin, Söderhamn, both of Sweden

[73] Assignee: Osa AB, Alfta, Sweden

[21] Appl. No.: 640,773

[22] Filed: Aug. 14, 1984

[30] Foreign Application Priority Data

Aug. 26, 1983 [SE] Sweden ................................ 8304633

[51] Int. Cl.$^4$ ................................................ B27L 1/00
[52] U.S. Cl. ..................................... 144/2 Z; 144/343
[58] Field of Search ......................... 144/2 Z, 343, 340

[56] References Cited

U.S. PATENT DOCUMENTS

| | | | |
|---|---|---|---|
| 3,385,331 | 5/1968 | Bronamo et al. | 144/2 Z |
| 3,690,352 | 9/1972 | Herolf | 144/2 Z |

FOREIGN PATENT DOCUMENTS

| | | | |
|---|---|---|---|
| 576216 | 10/1977 | U.S.S.R. | 144/2 Z |
| 596439 | 3/1978 | U.S.S.R. | 144/2 Z |
| 605712 | 5/1978 | U.S.S.R. | 144/2 Z |
| 605713 | 5/1978 | U.S.S.R. | 144/2 Z |
| 627968 | 8/1978 | U.S.S.R. | 144/2 Z |
| 941182 | 7/1982 | U.S.S.R. | 144/340 |

*Primary Examiner*—W. D. Bray
*Assistant Examiner*—Jorji M. Griffin
*Attorney, Agent, or Firm*—Cushman, Darby & Cushman

[57] ABSTRACT

A bundle limbing device, primarily for mobile use, is divided into two mirror-symmetrical halves, each with one front and one rear swinging arm (4a,4b) at their lower parts mounted on a low level of a forwarder and interconnected by means of longitudinal bars (14a,14b). At the ends of the swinging arms of each device half, front and rear bearing beams (6a,6b) are rigidly secured, which serve as bearings for a series of parallel limbing rolls (8). Support shoulders (13a,13b) at the top of the swinging arms form side supports for a bundle of trunk portions (12) which are deposited on the bed formed as the two device halves are brought together, when the opposite bearing beams (6a,6b) on the associated swinging arms meet and form an obtuse angle. Each limbing roll consists of a center tube (9) which supports a series of circular annular flanges (10) with alternating inclination to the tube shaft defining an elliptic rotational surface. All the rolls in each device half are first driven by a transmission in a direction in which the trunk portions lying above are carried along outwards towards the support shoulders while they are limbed and stirred which is promoted by the elliptic vibration. Branches then detached will pass out through openings between the outer rolls and the support shoulders. After finished limbing the two device halves are separated while reversing the direction of rotation of the rolls so that the limbed trunk portions are passed down into an underlying load space (7).

12 Claims, 8 Drawing Figures

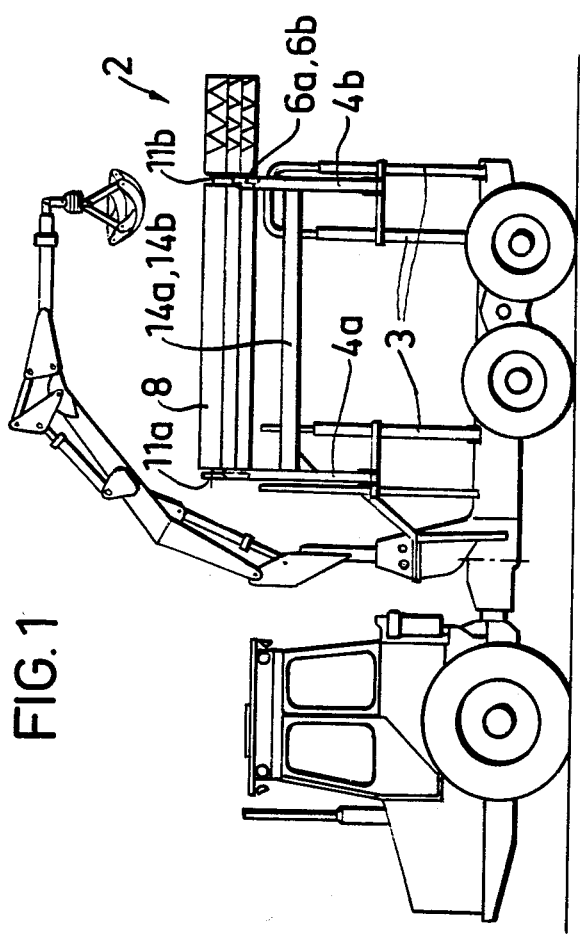
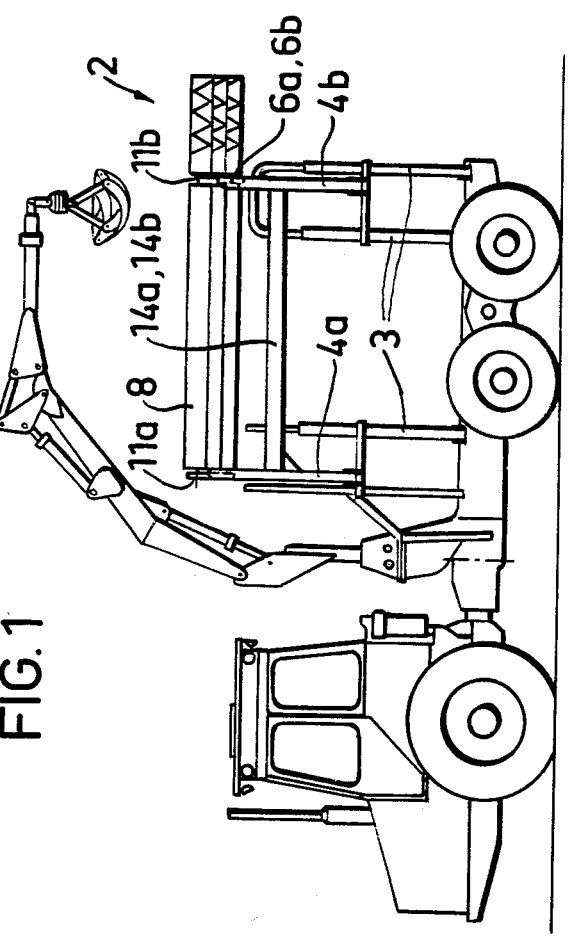
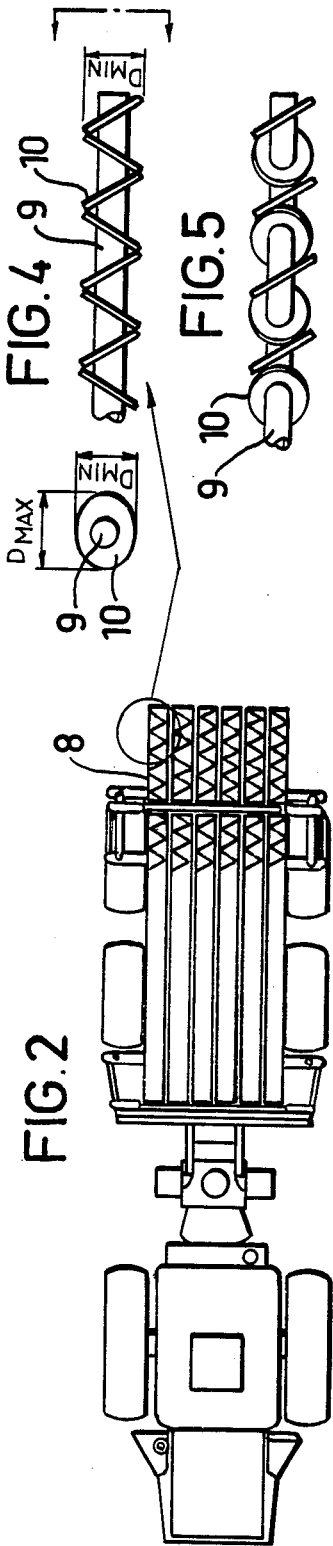

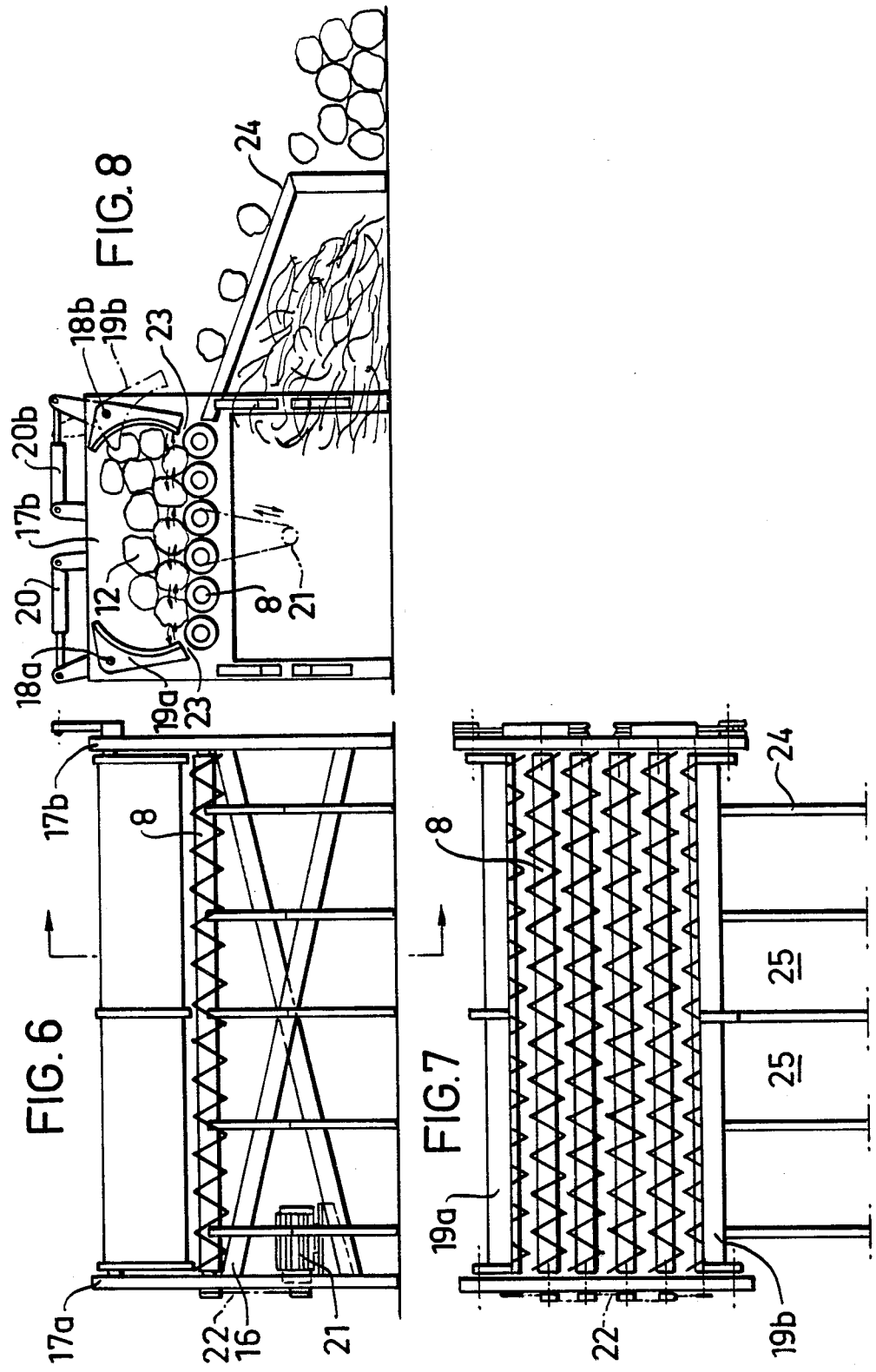

BUNDLE LIMBING DEVICE

This invention relates to a bundle limbing device which is intended to limb all pulp wood bits in an unlimbed pulp wood bundle satisfactorily without the bundle being divided into separate logs.

As to big trees from the final felling there are today many different types of devices limbing the separate tree-trunk, at the same time as it is cut to suitable log lengths. The relatively big volumes per trunk make it economically profitable to handle one tree at a time.

On the other hand, as far as processing of small-dimension thinning trees is concerned, it is necessary in respect of capacity to collect the trees in bundles as soon as possible which bundles are then a handling unit in the following process line. The current principle is that the thinning trees are combined directly at felling to suitably big tree bundles which are then handled as one unit. Owing to lack of fiber raw material the bundles are often only cut to suitable transport lengths after which the branches are allowed to accompany the trunk portions to the manufacturing industry where lopping is carried out in special stationary delimbing machines. The trunk portions thereafter go into the pulping process, while the branches are disintegrated to chips and in most cases become fuel. However, for different reasons it is required that the trunk portions should sometimes be limbed already in the stand so that completely branchless trunk portions can be transported directly to the landing site at a motor road.

Many different systems have been tested for limbing the small-dimension thinning trunks in the form of bundles in order to increase capacity but as yet no system has met the basic demand for a satisfactory limbing result with good economy.

However, the bundle limbing device according to the invention meets the demand for limbing quality as well as economic capacity as it includes a bed, having side supports, for receiving a bundle of trunk portions to be limbed, which bed is formed by a series of rolls which are rigidly mounted in their ends substantially parallelly with each other and with the side supports and provided with a plurality of shearing members inclined relative to the roll shaft, said shearing members being distributed along the lengths of the respective rolls, said rolls being synchronously operable for cutting off branches while tumbling over the trunk portions.

In addition, the device can be adapted to a logical link in the process chain which is not time-consuming: cutting to a bundle of trunk portions—loading—bundle limbing—loading—transport to a landing.

The limbing device is a supplementary part of the conveying machine, and therefore no extra limbing stages with a separate machine need be scheduled, which might incur both time losses and increased costs.

The invention will be described in the following with reference to the enclosed drawings.

FIGS. 1 and 2 are a schematical side and top plan view, respectively, of a forwarder provided with a bundle limbing device according to the invention, FIG. 3 is an end view of the device, FIGS. 4 and 5 are two different embodiments of limbing rolls, FIGS. 6 and 7 are a schematical side and top plan view, respectively, of a bundle limbing device according to the invention intended for stationary use and FIG. 8 is an end view of this device with supplementary equipment.

For the sake of clearness operational and driving means obvious to one skilled in the art have been omitted in some of the Figures.

Firstly, the mobile bundle limbing device will be described in connection with FIGS. 1-3.

A bundle limbing device generally designatd 2 is attached to the stakes 3 of the forwarder 1. The bundle limbing device 2 has two pairs of swinging arms 4a, 4b, which are articulatedly attached to a pivotal centre 5 located relatively low and close to the stakes 3. The swinging arms 4a, 4b extend above the stakes 3 so that bearing beams 6a, 6b inclined towards the centre of the vehicle and attached to each pair of the swinging arms 4 form an obtuse angle to each other without encroaching upon the actual load space 7. A set of limbing rolls 8 is rotatably mounted at each of the bearing beams 6a, 6b. The limbing rolls 8 consist of preferably circular or square centre tubes 9 extending along the vehicle 1, on which tubes circular limbing flanges 10. according to FIG. 4 have been placed at an alternately inclined angle to the centre tubes 9 so that the whole length of the centre tubes will be covered with limbing flanges. Alternatively, the limbing flanges 10 may have reciprocal positions in different patterns; e.g. they may have a helical form, stepwise angular displacement, different pitches etc. In FIG. 5 flanges 10 are shown as an example which besides alternating inclination also have alternating direction of inclination, viz. 90° displaced in peripheral direction from flange to flange.

At their front ends the centre tubes 9 have pivot pins 11a which are rotatably mounted in the front pair of bearing beams 6a, 6b. At their rear ends the centre tubes 9 are supported in bearings 11b at the rear pair of beams 6a, 6b. Each half of the bundle limbing device 2 is pivotable from a closed position "A" (full line) at the vehicle centre to a swung-out position "B" (dash and dot line). The limbing rolls 8 are rotated by means of a motor drive on one of the pivot pins 11a in each half of the bundle limbing device 2, while the other limbing rolls 8 in each pair of bearing beams are driven by sprocket or gear wheels from the corresponding roll. The drive takes place via a system of transmission members by means of which each limbing roll all according to one's wishes can be given the same or opposite direction of rotation as compared with the other limbing rolls.

As lateral supports of the tree bundle 12 a series of support shoulders 13a, 13b (alternatively a completely covering support beam) is placed above and somewhat outside the centre of the outermost limbing roll.

The limbing rolls 8 are preferably coordinated so that they rotate in the same direction (outwards) in each lateral half of the limbing device when limbing of bundles is going on, while the direction of rotation is reversed and the halves enter position "B" when limbing is reversed and the halves enter position "B" when limbing is finished and, consequently, the limbed bundle 12 is brought to fall down into the load space 7.

For reciprocal stabilization of the front and rear swinging arms 4a and 4b, respectively, these are connected to each other by means of longitudinal bars 14a, 14b (FIG. 1). In order to prevent the branches detached at the limbing from falling down into the load space 7 and mix with the branchless wood, outlet passages are arranged in the form of apertures between the outermost limbing rolls 8 and the support shoulders 13a, 13b. Moreover, at the upper part of the swinging arms 4a and 4b, respectively, guide plates 15a, 15b are arranged, which guide the falling branches to the outside of the load space 7. By the continuous rotation of the limbing rolls 8 the detached branches are prevented from falling down between the rolls in that they are moved outwards regularly via the upper side of the limbing flanges 10 which are circular in this case. These are attached to the centre tubes 9 with inclination and will consequently have a projected peripheral line of elliptic type ($D_{min}$, $D_{max}$ in FIG. 4). At the rotation of the limbing rolls 8 the limbing flanges 10 will thus make the wood bundle 12 vibrate in vertical direction by their non-roundness. Thanks to this the tree portions in the tree bundle 12 will be rotated through shaking and rotational influence from the limbing flanges so that the limbing work by the inclined flanges can be carried out efficiently around each separate trunk portion. By the inclination of the limbing roll system towards the centre and the regular rotation of the limbing flanges 10, the upper side moving from the centre towards the sides, the lowermost trunk portion of the tree bundle 12 will be caused to "wander outwards" while the uppermost ones move constantly towards the centre in an endless cyclic motion to fall down to a lower position at the centre and be subjected to successive limbing working.

The working order when utilizing the arrangement described above is as follows.

1. The forwarder travels along a strip road and stops at the first t ree bundle which has been collected with the root ends turned towards the strip road at a previous stage.
2. The driver swings out the crane arm (which is provided with a grapple saw) and grapples the tree bundle at some distance from the root ends corresponding to a suitable transport length. The grapple saw performs a cross cut straight across the whole bundle.
3. With maintained grip around the bundle of tree portions the driver now lifts the bundle and places it on the bundle limbing device of the forwarder.
4. The limbing rolls are started and the limbing process proceeds while the driver is swinging out the crane arm grappling the remaining portion of the tree bundle. If this is still too long as transport unit, he cuts the tree bundle once more.
5. Meanwhile the bundle limbing operation has been completed and the driver moves the bundle limbing halves apart to position "B" at the same time as he reverses the rotational direction of the limbing rolls. The limbed tree bundle is then fed towards the centre and down into the ordinary load space of the forwarder.
6. The bundle limbing halves are moved together towards the centre, and the driver loads the bundle of tree portions now cut. The limbing rolls are restarted with original direction of rotation and the procedure is repeated until the whole load space of the forwarder has been filled.
7. Transport to landing takes place.
8. At the landing the limbing rolls are moved apart to position "B" after which the driver unloads in usual manner by the aid of the loading crane.

As an alternative of limbing in the stand the limbing work can in certain cases also be performed at the landing. In this case the bundle limbing device can be designed according to a more robust principle with a stable framework managing big bundles, and in this way the device will have an extra great capacity.

A device according to a stationary embodiment which is still based on the basic idea of the invention, viz. the use of a series of limbing rolls with inclined limbing flanges, is described briefly in connection with FIGS. 6-8. For similar details the same reference numerals have been used as those in FIGS. 1-3.

As distinguished from the mobile device the stationary one is not divided into two halves as in this case one is not restricted to managing the work within the borders of a narrow strip road.

According to FIGS. 6 and 8 a framework 16 supports end sections 17a, 17b in which all the limbing rolls 8 are mounted on the same level above the ground. Adjacent the top of each end section bearing points 18a, 18b for pivotable side supports are also arranged, in this case in the form of inwardly arched support beams 19a, 19b in order to facilitate the rotation and stirring of the bundle 12 of tree parts in the chamber formed. For operation of the support beams the hydraulic cylinders 20a, 20b, respectively, serve and for operation of the limbing rolls a drive motor 21 placed under the roll plane, which can drive all the rolls reversibly via a chain transmission 22 in one direction or the other.

An interspace 23 is provided between each of the outermost rolls and the lower edge of the adjacent support beams 19a, 19b.

An inclined discharge bridge 24 consisting of spaced beams, as seen in FIG. 7, is connected to the pivotable support beam 19b of one side so that slots 25 are formed.

The arrangement functions in the following way after loading of the bundle 12 and start of the motor 21:

As all the rolls rotate in the same direction the bundle is compelled to "climb" up the support beam 19a or 19b, toward which the bundle is moving due to the rotation of the limbing rolls. The direction of rotation of the limbing rolls is reversed at short intervals which facilitates the stirring and limbing of the bundle. Branches coming loose are fed towards the sides through the interspaces 23 and fall down to the ground between the slots 25 in the discharge bridge 24. After finished limbing one support beam is tilted to a discharge position (dash and dot line in FIG. 8) which provides an opening for the limbed tree portions so that they roll down to the ground outside the extension of the branch stack via the discharge bridge. The device can with advantage be supplemented with a previously known conveyor, not shown, on which the branches fallen down are continuously fed away to an area not impeding the continuous bundle limbing. Of course there may be a discharge bridge on both sides.

The invention is not restricted to the two embodiments described above but different modifications are possible within the scope of the invention, especially by replacing the details shown with equivalent ones.

What we claim is:

1. Apparatus for removing limbs from a bundle of tree trunks, comprising a bed, having side supports for receiving a bundle of trunk portions to be limbed, which bed is formed by a plurality of mutually parallel rotatable rolls, each roll carrying along its length a plurality of flanges having limbing edges and being alternately inclined towards each other in such a manner that the edges border on each other from one inclined flange to the other, the rolls being synchronously rotatable for removing branches.

2. Apparatus as in claim 1 wherein each roll includes a center tube and wherein said flanges are annular flanges surrounding the tube.

3. Apparatus as in claim 2 wherein the direction of inclination of said flanges is displaced in the peripheral direction of the tube for each flange by 90°.

4. Apparatus as in claim 2 wherein the annular flanges are circular so that their axial projection defines ellipses for alternating lifting and lowering of overhead trunk portions.

5. Apparatus as in claim 1 including a transmission connecting the rolls for rotating the other rolls, when one roll is driven, in the same or alternating directions while tumbling-over the three trunk portions.

6. Apparatus as in claim 1 wherein the direction of rotation of the rolls is arranged to be reversed periodically during the limbing procedure in order to promote stirring and limbing of the overhead trunks.

7. Mobile apparatus for removing limbs from a bundle of tree trunks comprising a bed formed by a series of mutually parallel rolls, each roll carrying along its length a plurality of flanges having limbing edges and being alternately inclined toward each other in such a manner that the edges border on each other from one inclined flange to the other, means for synchronously rotating the rolls to thereby remove branches, said bed being divided into two halves, the rolls in each bed half having their ends mounted in a front and a rear bearing beam, respectively, the beams being secured to the ends of front and rear upwards extending swinging arms which carry the bearing beams and which are pivoted for swinging movement at locations below the beams, the disposition of the beams relative to the arms and the pivot locations of the arms being such that in one position of the arms the beams meet each other to form a bed for receiving a bundle of tree trunks from above and another position in which the beams are spaced from each other so that limbed trunks can be deposited in a load space below the beams.

8. Apparatus as in claim 7 wherein for the limbing action the rolls in the bearing beams of each half are arranged to be driven in a direction of rotation tending to move the trunk portions in a direction from a common center towards side supports, and after limbing be driven in an opposite direction of rotation when the bearing beams are separated, in order to promote the downward discharge of the limbed trunks.

9. Apparatus as in claim 7 wherein apertures are arranged between the outermost roll in the bearing beams of each half and side supports for continuous discharge of the detached branches outside the load space.

10. Stationary apparatus for removing limbs from a bundle of tree trunks comprising, a bed for a bundle of trunks formed by a series of mutually parallel rolls, each roll carrying along its length a plurality of flanges having limbing edges and being alternately inclined toward each other in such a manner that the edges border on each other from one inclined flange to the other, the rolls being synchronously operable for removing branches, said bed being plane and having the ends of its rolls mounted in front and rear end sections, respectively, which end sections together with bridging side supports mounted rotatably at their tops form a chamber for receiving the trunks for limbing, one side support being arranged to be swung out to allow the rolls still rotating to discharge the limbed trunks laterally.

11. Apparatus as in claim 10 wherein the bed is supported above ground level and at least on one side has a connected, downwardly inclined discharge bridge with apertures in the form of longitudinal slots, and the lower ends of the side supports show interspaces to the associated outer rolls, so that branches detached in the limbing process are driven out onto the bridge via the interspaces to fall down into a collecting space while the limbed trunk portions after a swung-out side support are discharged to a load space arranged after the bridge on a lower level for transport therefrom.

12. Apparatus as in claim 10 having ground-engaging wheels for transport between working places.

* * * * *